(12) United States Patent
O'Connell et al.

(10) Patent No.: US 8,296,511 B1
(45) Date of Patent: Oct. 23, 2012

(54) METHOD AND SYSTEM OF PROVIDING OBJECT LOCATION METADATA COOKIES IN A FEDERATED CONTENT ADDRESSABLE STORAGE SYSTEM

(75) Inventors: Mark O'Connell, Westborough, MA (US); Tom Teugels, Schoten (BE)

(73) Assignee: EMC Corporation, Hopkinton, MA (US)

( * ) Notice: Subject to any disclaimer, the term of this patent is extended or adjusted under 35 U.S.C. 154(b) by 517 days.

(21) Appl. No.: 12/459,194

(22) Filed: Jun. 26, 2009

(51) Int. Cl.
*G06F 12/00* (2006.01)
(52) U.S. Cl. .......... 711/108; 711/101; 711/154
(58) Field of Classification Search ............ 711/108, 711/101, 154
See application file for complete search history.

(56) References Cited

U.S. PATENT DOCUMENTS

| | | | |
|---|---|---|---|
| 7,240,150 B1 * | 7/2007 | Todd et al. | 711/108 |
| 7,240,151 B1 | 7/2007 | Todd et al. | |
| 7,428,611 B1 | 9/2008 | Todd et al. | |
| 7,539,813 B1 | 5/2009 | Todd et al. | |
| 2005/0193084 A1 | 9/2005 | Todd et al. | |

\* cited by examiner

*Primary Examiner* — Yong Choe
(74) *Attorney, Agent, or Firm* — Muirhead and Saturnelli, LLC

(57) ABSTRACT

Managing data on a federated CAS system includes determining a group of objects to be stored on a single CAS system of the federated CAS system, obtaining a cookie corresponding a particular one of the CAS systems of the federated CAS system in response to initially writing at least one object of the group of objects, where the at least one object is written to the particular one of the CAS systems, and providing the cookie in connection with writing objects of the group of objects following initially writing at least one object of the group of objects. The cookie causes the objects to be written to the particular one of the CAS systems. The cookie may be provided by at least one router that maintains the federated CAS system, which may be separate from both a processing device and the particular one of the CAS systems.

22 Claims, 8 Drawing Sheets

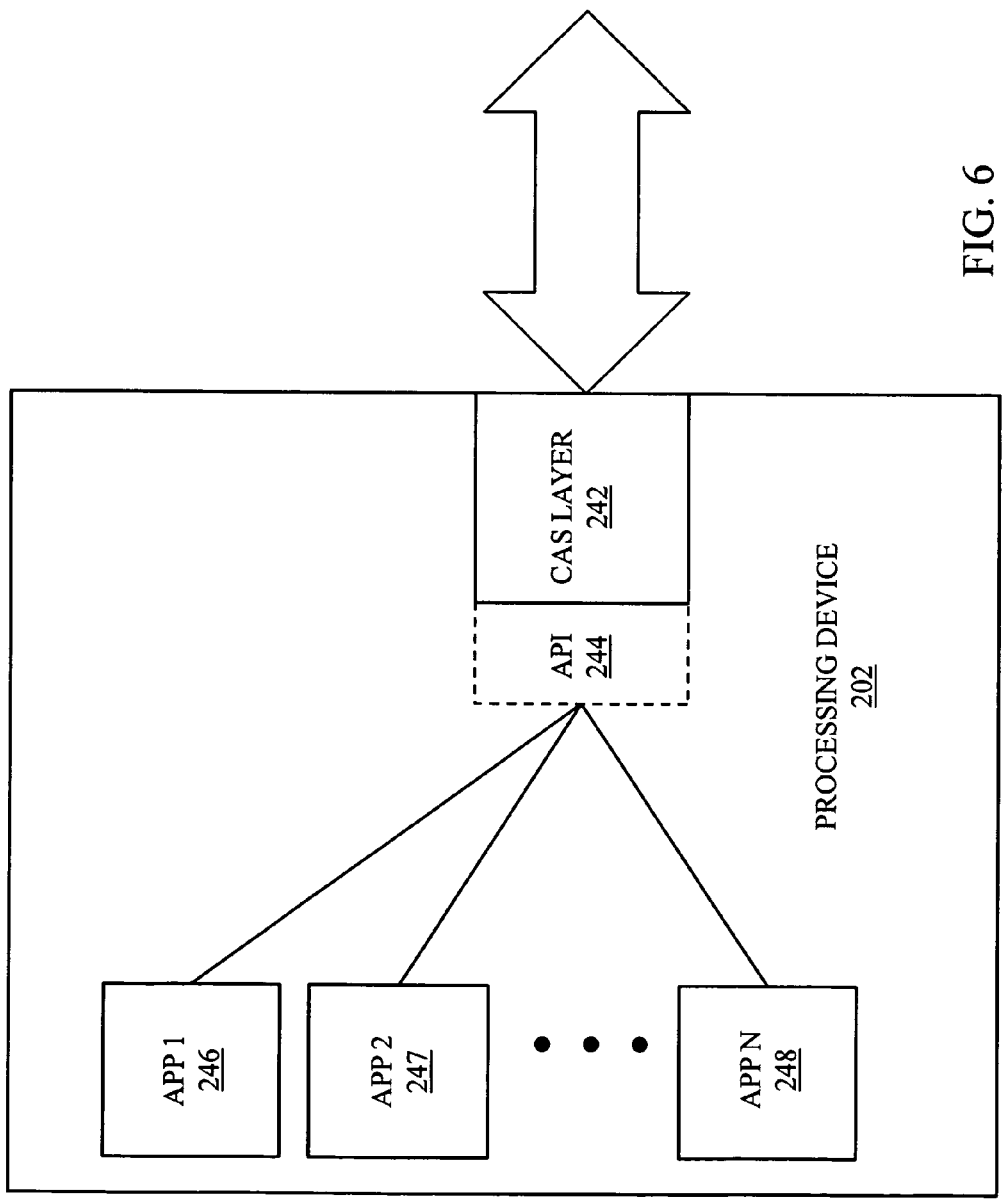

METHOD AND SYSTEM OF PROVIDING OBJECT LOCATION METADATA COOKIES IN A FEDERATED CONTENT ADDRESSABLE STORAGE SYSTEM

BACKGROUND OF THE INVENTION

1. Technical Field

This application relates to the field of computer data storage, and more particularly to the field of content addressable storage systems.

2. Description of Related Art

Computer application programs store computer code and data manipulated by the computer code. A computer system may include one or more host computers or servers that execute such application programs and one or more storage systems that store data generated and/or used by the application programs, including possibly the programs themselves. In such a computer system, a storage system may include a plurality of physical storage devices (e.g., disk devices) on which the data is stored.

Some storage systems receive and process access requests that identify data or other content using a content address, rather than an address that specifies where the data is physically or logically stored in the storage system. A content address may be an address that is computed based, at least in part, on the content of its corresponding unit of content, which can be data and/or metadata. For example, a content address for a unit of content may be computed by hashing the unit of content and using the resulting hash value to form at least part of the content address. Storage systems that identify and access content units by a content address are referred to herein as content addressable storage (CAS) systems.

FIG. 1 shows a processing device 102 coupled to a CAS system 104. The processing device 102 may be any processing device, such as a host computer, a server, a dedicated processing device, or generally any device capable of reading and writing digital data. The CAS system 104 represents one or more storage devices that store digital data that is accessed using an address based, at least in part, on the content of what is being stored. In some cases, the CAS system 104 may include multiple CAS systems that are integrated into a federated CAS system. The CAS system 104 (whether it is a federated CAS system or not) may appear as a single system to the processing device 102.

FIG. 2A illustrates a write request 106 that includes the content to be written to the CAS system. The processing device provides the write request 106 to the CAS system 104 which stores the data therein. In response to the write request 106, the CAS system 104 provides an identifier that may be used to access that data that was written. The identifier may have any appropriate form, such as a numeric identifier or token. The identifier does not indicate the actual physical or logical storage location of the data that was written. In some cases, the CAS system 104 may move the data to different physical and/or logical locations at any time after the data is initially stored, while providing for access to the data using the same identifier. The CAS system 104 may determine the storage location of the data, based on the identifier, in a manner that is transparent to the processing device 102. So long as the processing device 102 presents the identifier (and, in some cases, appropriate security credentials), the processing device 102 may access the data written to the CAS system 104.

Referring to FIG. 2B, a read request 108 is shown as including an identifier. The read request 108, including the identifier, is provided from the processing device 102 to the CAS system 104, which returns the requested data to the processing device 102. Of course, it is possible in some cases for the data to not be available for any number of reasons, such as the identifier being incorrect, a system being off-line, etc.

Because the content address associated with a content unit may be independent of where the content unit is stored, the processing device 102 need not be aware of the physical or logical storage location of the content unit on the CAS system 104. However, in the case of a federated CAS system (an integrated CAS system that includes a plurality of individual CAS systems), the identifier may be useful for accessing data only after the individual one of the CAS systems that contains the data is determined. The identifier may not distinguish between the different individual CAS systems in a federated CAS system, and finding the correct one of the CAS system each time data is accessed by polling all of the systems may be inefficient.

Accordingly, it is desirable to be able to provide a federated CAS system in which data may be accessed efficiently without the need to repeatedly poll each of the individual CAS systems to find data each time data is accessed.

SUMMARY OF THE INVENTION

According to the system described herein, managing data on a federated CAS system includes determining a group of objects to be stored on a single CAS system of the federated CAS system, obtaining a cookie corresponding a particular one of the CAS systems of the federated CAS system in response to initially writing at least one object of the group of objects, where the at least one object is written to the particular one of the CAS systems, and providing the cookie in connection with writing objects of the group of objects following initially writing at least one object of the group of objects, where the cookie causes the objects to be written to the particular one of the CAS systems. The particular one of the CAS systems may be chosen based on a metric. The metric may include load balancing. The cookie may be provided by at least one router that maintains the federated CAS system. The at least one router may be separate from both a processing device and the particular one of the CAS systems. The at least one router may be integrated with either a processing device or the particular one of the CAS systems. A processing device may communicate with the federated CAS system. Applications on the processing device may communicate with the federated CAS system through a CAS layer that interprets and translates commands.

According further to the system described herein, computer software, provided in a computer-readable software medium, manages data on a federated CAS system. The software includes executable code that provides a cookie corresponding a particular one of the CAS systems of the federated CAS system in response to receiving an initial write request to store at least one object in the federated CAS system and the software includes executable code that stores subsequent objects in the particular one of the CAS systems in response to receiving a write request that includes the cookie. The particular one of the CAS systems may be chosen based on a metric. The metric may include load balancing. The computer readable medium may be accessed by at least one router that maintains the federated CAS system. The at least one router may be separate from both a processing device and the particular one of the CAS systems. The at least one router may be integrated with either a processing device or the particular one of the CAS systems.

According further to the system described herein, a federated CAS system includes a plurality of CAS systems and a plurality of routers, coupled to the CAS systems, where, in response to receiving an initial write request to store at least one object in the federated CAS system, at least one of the routers provides a cookie corresponding a particular one of the CAS systems of the federated CAS system and in response to receiving a write request that includes the cookie, subsequently written objects are stored in the particular one of the CAS systems. The particular one of the CAS systems may be chosen based on a metric. The metric may include load balancing.

The at least one router may be separate from the particular one of the CAS systems. The at least one router may be integrated with the particular one of the CAS systems.

BRIEF DESCRIPTION OF DRAWINGS

Embodiments of the system are described with reference to the several figures of the drawings, noted as follows.

FIG. 6 is a schematic diagram illustrating in detail a processing device with a CAS layer and an API according to an embodiment of the system described herein.

DETAILED DESCRIPTION OF VARIOUS EMBODIMENTS

Figure 2B:
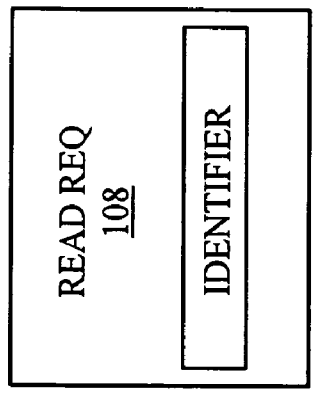
FIG. 2A and FIG. 2B are a schematic diagrams illustrating conventional CAS read and write requests.
Figure 2A:
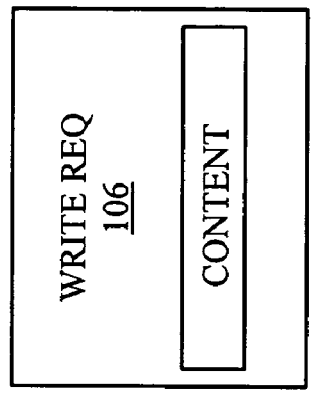
Figure 1:
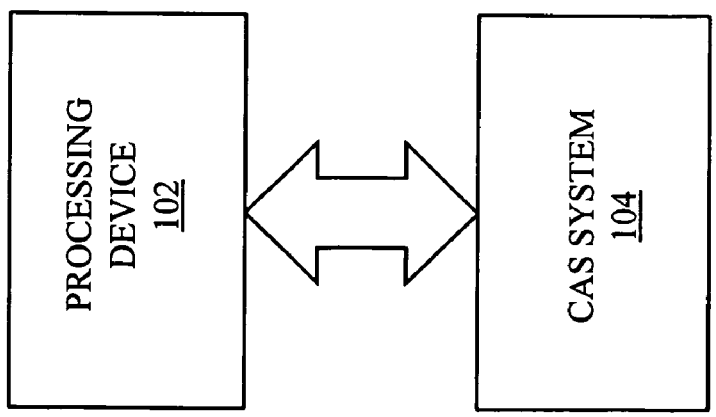
FIG. 1 is a schematic diagram illustrating a conventional Content Addressable Storage (CAS) system coupled to a processing device.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Figure 3:
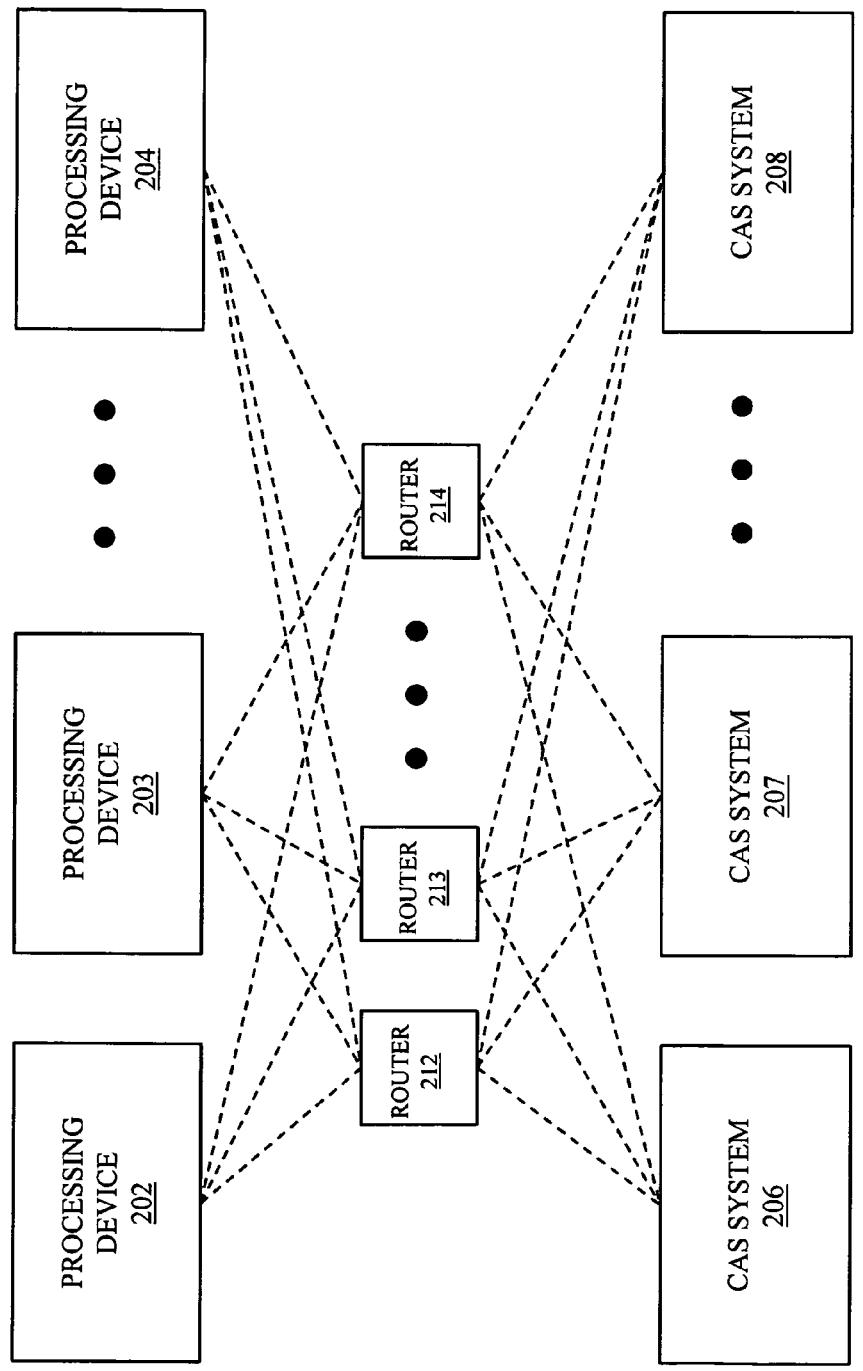
FIG. 3 is a schematic diagram illustrating interconnected processing devices and CAS systems according to a first embodiment of the system described herein.

FIG. 3 illustrates a computer system 200 that includes a plurality of processing devices 202-204 and a plurality of content addressable storage (CAS) systems 206-208. Although only three processing devices 202-204 are shown in FIG. 3, the depiction in FIG. 3 and corresponding discussion herein includes any number of processing devices. Similarly, although only three CAS systems 206-208 are shown in FIG. 3, the depiction in FIG. 3 and corresponding discussion herein includes any number of CAS systems. Generally, unless otherwise specifically indicated, the system described herein provides for any number of devices even though a particular number may be used for illustrative purposes.

The processing devices 202-204 may be general purpose host computers, specialized processing devices, and/or any device capable of reading and writing digital data from and to the CAS systems 206-208. One or more of the processing devices 202-204 may optionally include a CAS layer (not shown in FIG. 3) that facilitates CAS functionality in a conventional manner by passing and, in some cases, interpreting and/or translating, data and/or commands between the processing devices 202-204 and the CAS systems 206-208. An application program interface (API) (not shown in FIG. 3) may be interposed between a CAS layer and an application residing on a processing device. In instances where a processing device does not include a CAS software layer, applications residing thereon may communicate directly with the CAS systems 206-208. Note that it is also possible to implement a system where some or all of the functionality provided by the CAS layer and/or the API are provided by one or more units that are separate from the processing devices 202-204.

An item of data stored on the CAS systems 206-208 may be referred to generally as a "content unit". The CAS systems 206-208 may store two different types of content units: a blob and a content descriptor file (CDF). A blob is a first type of content unit that includes descriptive data (e.g., application data). A CDF is a second type of content unit that includes metadata (e.g., descriptive information) about another content unit such one or more blob or other CDFs, and may, but need not, include other data.

In some embodiments, forwarding an I/O request received by the CAS layer to the CAS systems 206-208 and/or to the processing devices 202-204 may include generating a new I/O request that is substantively the same as or similar to the received I/O request and sending the new I/O request to the destination thereof. Alternatively, forwarding an I/O request may include forwarding the received I/O request with additional translation and/or interpretation.

Each of the CAS systems 206-208 may be implemented using one or more data storage devices. To an outside device, each of the CAS systems appears the same irrespective of whether a single storage device or a plurality of storage devices are used. As discussed elsewhere herein, writing to one of the CAS systems 206-208 results in an identifier being returned to the writer. The identifier may be used in later read and write requests to access the data.

The CAS systems 206-208 may be combined to form a federated CAS system where, from the point of view of an application program, the multiple CAS systems 206-208 appear as a single CAS system. Thus, an application program need not be concerned with which of the CAS systems 206-208 a requested unit of content is stored and thus may treat the multiple CAS systems 206-208 as a single CAS system. Implementing a federated CAS system is described in greater detail in U.S. patent publication no. 20050193084 entitled "Methods And Apparatus For Increasing Data Storage Capacity," filed on Feb. 26, 2004, which is incorporated by reference herein. It should be appreciated that the functionality described in that application relating to coordinating two or more CAS systems to work together as a federation may be implemented in a separate layer of software, such as the CAS layer, described elsewhere herein.

The system 200 may include a plurality of routers 212-214 interposed between the processing devices 202-204 and the CAS systems 206-208 to facilitate presenting the CAS systems 206-208 as a single federated CAS system. The routers 212-214 may route read and write requests between the processing devices 202-204 and the CAS systems 206-208. The routers 212-214 may make the routing transparent to the processing devices 202-204 so that the plurality of CAS systems 206-208 appear to the processing devices 202-204 as a single federated system. In an embodiment herein, the routers 212-214 present to the processing devices 202-204 an interface and functionality similar to that provided by a CAS system and the routers 212-214 present to the CAS systems 206-208 an interface and functionality similar to that provided by one or more processing devices.

The routers 212-214 illustrated in FIG. 3 may be implemented using conventional routers and/or using any device capable of providing the routing functionality as described herein. Thus, for example, the routers 212-214 may be provided by one or more general purpose computers programmed to provide routing functionality and having provision for appropriate connections to the processing devices 202-204 and the CAS systems 206-208.

The routers 212-214 may route data written by the processing devices 202-204 to a particular one of the CAS systems 206-208. The routers 212-214 may route the data according to any metric or algorithm. For example, the routers 212-214 may attempt to load balance the data among the CAS systems 206-208. As another example, the routers 212-214 may route the data based on specific capabilities of the CAS systems 206-208 and/or specific characteristics of the data. Irrespective of what criteria is used to route the data, it is useful to be able to access the data on the correct one of the CAS systems 206-208 after it has been stored thereon. It is also useful to be able to group portions of the same object onto a single one of the CAS systems 206-208. The system described herein provides that functionality, as described in more detail elsewhere herein.

Figure 4:
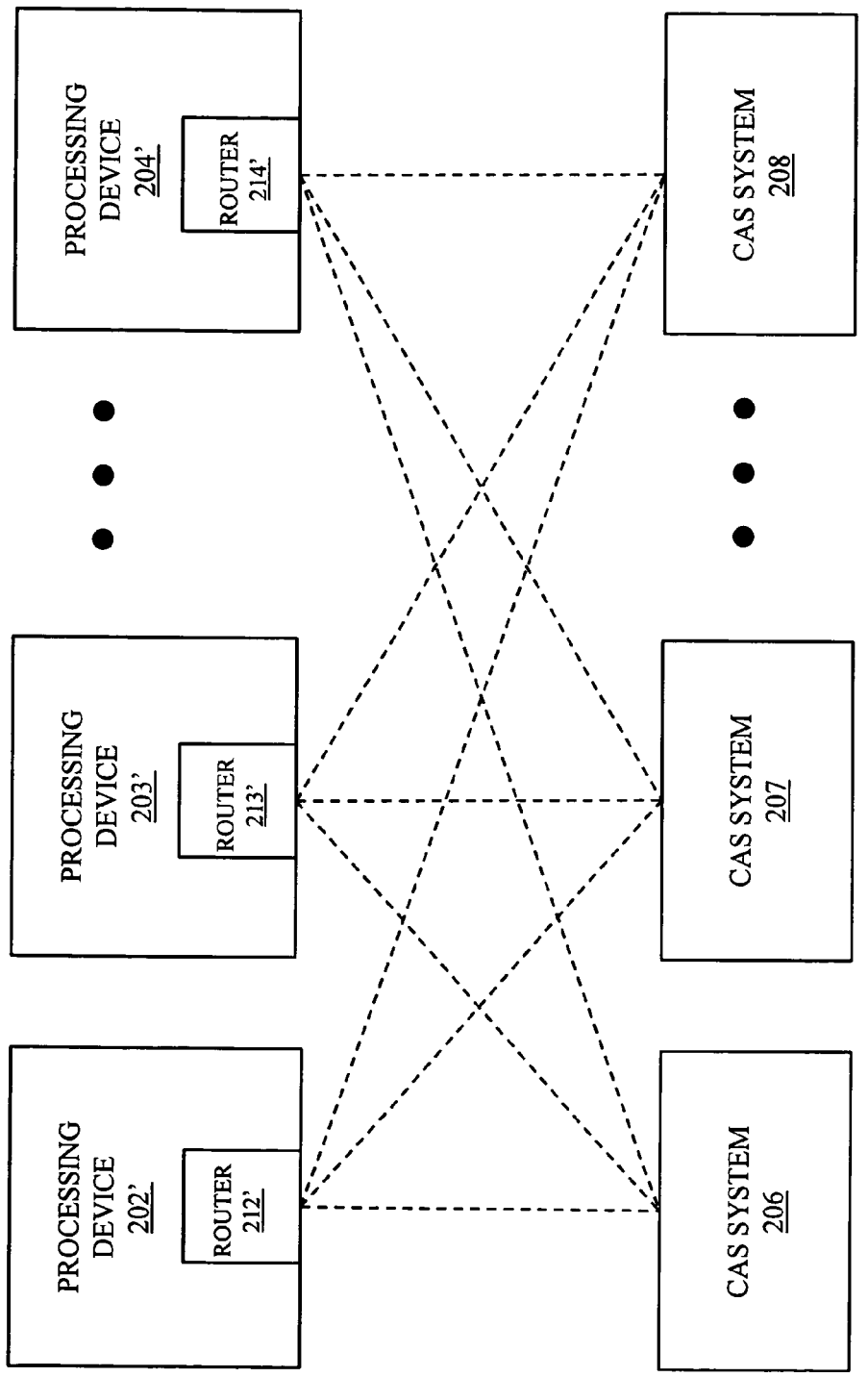
FIG. 4 is a schematic diagram illustrating interconnected processing devices and CAS systems according to a second embodiment of the system described herein.

Referring to FIG. 4, a system 220 is shown in which routing functionality provided by a plurality of routing modules 212'-214', each of which is integrated with each of a plurality of processing devices 202'-204'. Thus, the routing module 212' is integrated with the processing device 202', the routing module 213' is integrated with the processing device 203', and the routing module 214' is integrated with the processing device 204'. The processing devices 202'-204' may otherwise be the same or nearly the same as the processing devices 202-204 of FIG. 3. Similarly, the routing modules 212'-214' may provide the same functionality as the routers 212-214 of FIG. 3. The routing modules 212'-214' may cause the plurality of CAS systems 206-208 to appear as a single federated CAS system to an application program (and/or a CAS layer and/or an API, as discussed elsewhere herein) running on one of the processing devices 202'-204'.

Figure 5:
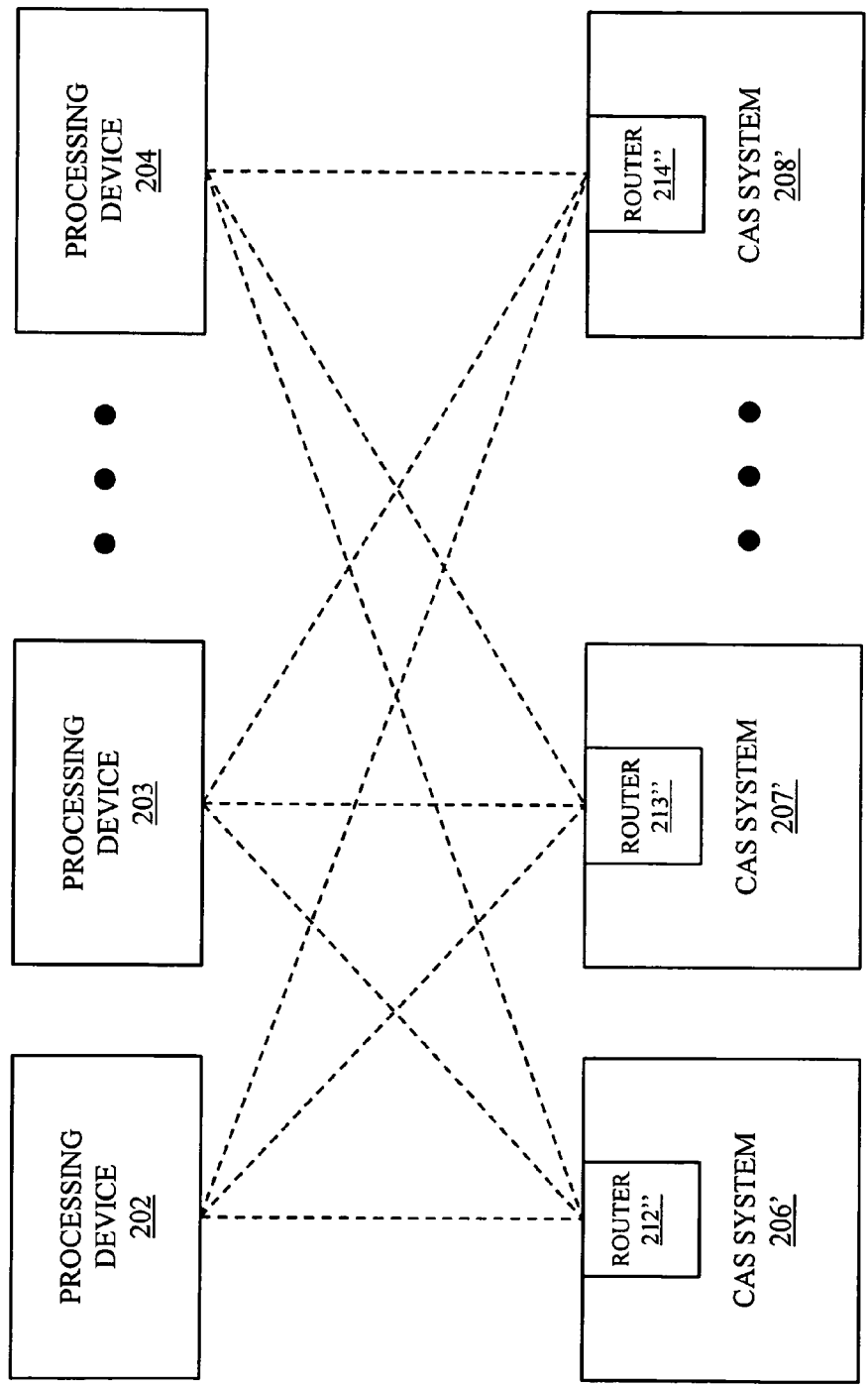
FIG. 5 is a schematic diagram illustrating interconnected processing devices and CAS systems according to a third embodiment of the system described herein.

Referring to FIG. 5, a system 230 is shown in which routing functionality provided by a plurality of routing modules 212"-214", each of which is integrated with each of a plurality of CAS systems 206'-208'. Thus, the routing module 212" is integrated with the CAS system 206', the routing module 213" is integrated with the CAS system 207', and the routing module 214" is integrated with the CAS system 208'. The CAS systems 206'-208' may otherwise be the same or nearly the same as the CAS systems 206-208 of FIG. 3. Similarly, the routing modules 212"-214" may provide the same functionality as the routers 212-214 of FIG. 3. The routing modules 212"-214" may cause the plurality of CAS systems 206'-208' to appear as a single federated CAS system to an application program (and/or a CAS layer and/or an API, as discussed elsewhere herein) running on one of the processing systems 202-204.

Referring to FIG. 6, the processing device 202 is shown in more detail as including a CAS layer 242, an optional API 244, and a plurality of applications 246-248. As discuss elsewhere herein, the CAS layer 242 may facilitate communication with the CAS systems 206-208 by interpreting/translating information exchanged therewith. Note that the CAS layer 242 may be provided in a hardware unit separate from the processing device 202, including being provided on one or more of the routers 212-214. The API 244 is optional and, in embodiments that do not include the API 244, the applications may communicate directly with the CAS layer 242. Similarly, for some embodiments, there is no CAS layer 242 (and possibly no API 244), in which case each of the applications 246-248 could communicate directly with the CAS systems 206-208 (i.e., through the routers 212-214).

The CAS layer 242 may be implemented as a set of layered drivers, each of which performs a specific portion of the functionality provided by the CAS layer 242. It should be understood that the set of layered drivers may include any suitable number of layers that perform the types of functions discussed herein. In some embodiments, each layered driver is modular so that the set of layered drivers in the CAS layer 242 may be altered, for example, based on the needs of the system, and so that the functionality provided by each layer can be coded separately, rather than having one monolithic set of code that implements the different functions. The functions performed by the different sets of layered drivers may be different. In some embodiments, the CAS layer 242 may be provided as an add-on layer to a fully functional processing device/CAS system environment. This is advantageous because the CAS layer 242 may add flexibility in implementing certain types of functionality, since the other portions of the system need not be modified to implement the functionality implemented on the CAS layer 242.

As mentioned above, in some embodiments, the CAS layer 242 receives I/O requests (directly or through the API 244) and determines the operations specified thereby. This can be done in any suitable way and the system described herein is not limited in this respect. For example, the interface to the CAS systems 206-208 may include a set of instructions to which the CAS systems 206-208 respond, with one or more fields (e.g., an operation code or OPCODE) in an I/O request being dedicated to specifying which (if any) of the instructions is specified by a particular I/O request.

In some embodiments, it is possible to use the CAS layer 242 and/or the API 244 only under certain conditions but not in others. For example, the CAS layer 242 may be bypassed when reading or writing data. In an embodiment, the CAS layer 242 may first examine an I/O request to determine if the I/O request meets one or more conditions. For example, the CAS layer 242 may examine the quantity of data to be transferred by a read or write request. If the quantity of data exceeds a particular threshold, the CAS layer 242 may establish a connection directly to transfer the data without the data passing through the CAS layer 242. If the quantity of data does not exceed the threshold, the data may be transferred through the CAS layer 242. In other embodiments, the CAS layer 242 may be bypassed on all I/O requests involving transfer of data, regardless of any conditions, such as the size of the I/O request.

Establishing a connection between the CAS systems 206-208 and the processing devices 202-204 may be done in any suitable way. For example, the CAS layer 242 may send a communication to instruct the CAS systems 206-208 to contact a particular one of the processing devices 202-204. Alternatively, the CAS layer 242 may send communications to both the CAS systems 206-208 and the particular one of the processing devices 202-204 to set up the connection.

Figure 7:
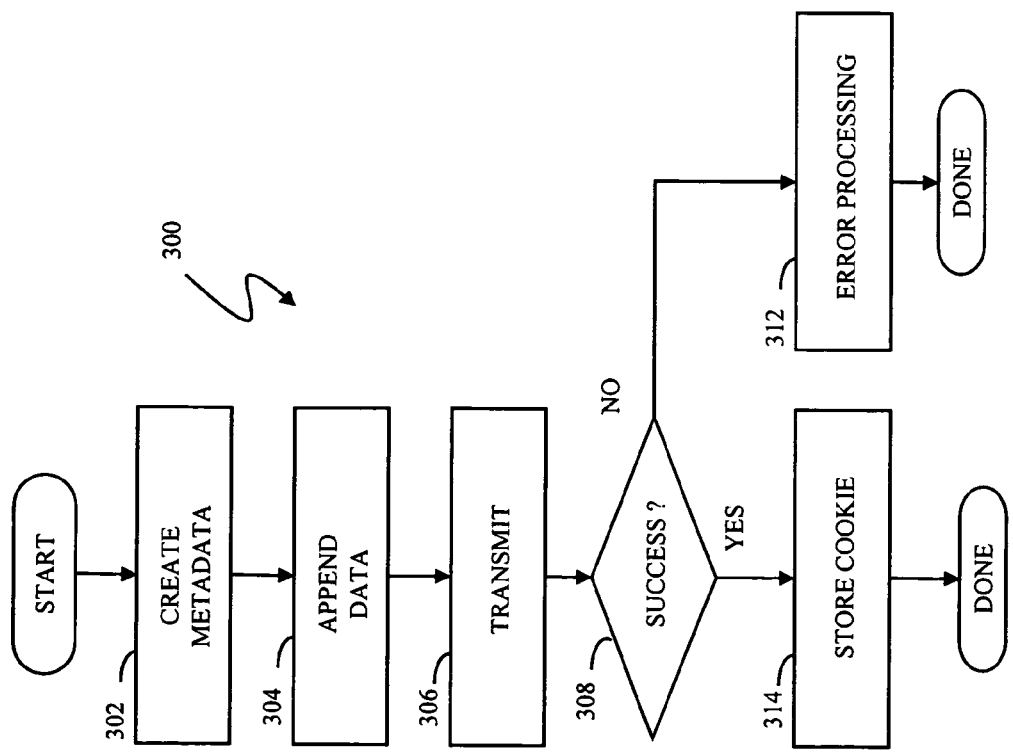
FIG. 7 is a flow chart illustrating steps performed in connection with providing an initial write and obtaining a cookie according to an embodiment of the system described herein.

Referring to FIG. 7, a flow chart 300 illustrates steps performed by at least one of the processing devices 202-204 in connection with performing a data write to the CAS systems 206-208, where the data write is the first of a group of data writes in which it is desirable to provide all the write to the same one of the CAS systems 206-208. The processing illustrated by the flow chart 300 may be performed by the CAS layer 242 and/or the API 244 and/or one of the applications 246-248 and/or possibly some other entity of one of the processing devices 202-204. It is also possible for at least some of the processing to be performed by an entity outside of the processing devices 202-204.

As discussed elsewhere herein, the processing devices 202-204 write objects to the federated CAS system, which is made up of the plurality of individual CAS systems 206-208, without directing the data to a specific one of the CAS systems 206-208. Instead, the processing devices 202-204 write objects that are routed to a particular one of the CAS systems 202-204 by the routers 212-214 and/or by the CAS systems 206-208 and/or by some other entity that applies a particular algorithm or metric to choose a particular destination one of the CAS systems 206-208.

Processing begins at a first step 302 where appropriate metadata for the object write operation is configured. The particular metadata used with an object write operation is implementation dependent, but may include items such as a time stamp, an identifier of the application and processing device causing the write, etc. Following the step 302 is a step 304 where the data for the object (the data being written) is appended to the metadata. Following the step 304 is a step 306 where the object data and metadata are transmitted (e.g., provided to one of the routers 212-214).

Following the step 306 is a test step 308 where it is determined if the result (returned by the router, for example) of the transfer at the step 306 indicates that the transfer was successful. There are many reasons why a transfer may have been unsuccessful, such as unavailability of one or more of the CAS systems 206-208, a failed connection between components, etc. If it is determined at the test step 308 that the data transfer was unsuccessful, then control transfers from the test step 308 to a step 312 where error processing is performed. The error processing performed at the step 312 may include providing an error message to a user, logging an error, etc. Any appropriate error processing may be performed at the step 312. Following the step 312, processing is complete.

If it is determined at the test step 308 that the data transfer at the step 306 was successful, then control transfers from the test step 308 to a step 314 where a cookie, returned in connection with the transfer process, is stored. As discussed in more detail elsewhere herein, the cookie is used in connection with subsequent writes for objects that are grouped together for which it is desirable to have the data stored on a single one of the CAS systems 206-208. For example, it may be desirable to create a word processing file for a single document on a single one of the CAS systems 206-208. As another example, a CDF may correspond a particular plurality of blobs, in which case it may be desirable to have the CDF and all associated blobs be stored on the same one of the CAS systems 206-208. In such cases, the processing illustrated by the flow chart 300 may be performed for the first write and the cookie obtained at the step 314 may be used for subsequent writes (e.g., of the remaining portions of the document or the remaining blobs for the CDF). Following the step 314, processing is complete.

The cookie may be provided in any appropriate form useful for identifying one of the CAS systems 206-208, including a token, a numeric identifier, a string, etc. The cookie may be a flexible data structure that allows multiple independent pieces of information to co-exist therein. The pieces of information can stem from multiple software parts ("components") of the routers 212-214 and/or CAS systems 206-208. The cookie may be used as a channel for communicating state. Thus, for example, the CAS systems 206-208 may store data in the cookie, not just the routers 212-214. The processing devices 202-204 (and/or any other client entity) may treat cookies as opaque and not try to interpret the data therein in any way. This isolates the processing devices 202-204 (and/or any other client) from version/configuration changes at the routers 212-214 and/or at the CAS systems, adding more guarantees for smooth interoperability. Cookies may lend themselves to being generalized into a hierarchical concept.

In some embodiments, it is possible for one of the routers 212-214 to generate a new cookie while another one of the routers 212-214 handles the first write request. In some cases, it may be desirable to append to or otherwise modify an already-existing group of objects or portions thereof. In such a case, it is possible to query the system to obtain a cookie for the already-existing group of objects in a federated CAS system. Just as with the initial write, subsequent accesses may be handled by a different one of the routers 212-214 that generated the cookie and/or that handled the first write. This makes the system more resilient to individual component failures and issues relating to reconfiguration during operation.

Figure 8:
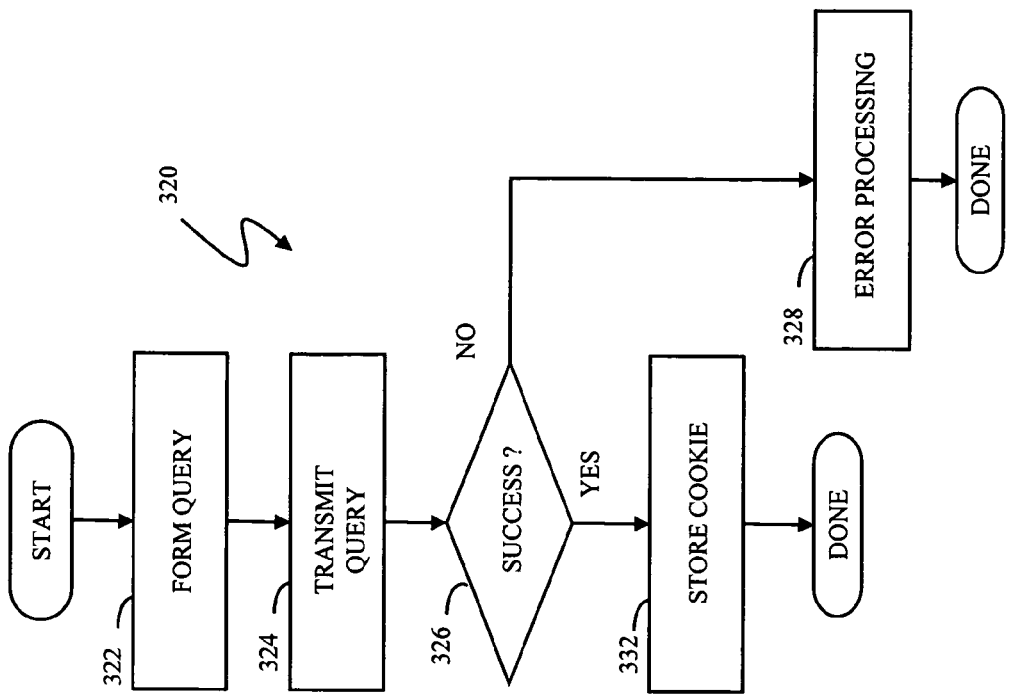
FIG. 8 is a flow chart illustrating steps performed in connection with performing a query to obtain a cookie according to an embodiment of the system described herein.

Referring to FIG. 8, a flow chart 320 illustrates steps performed in connection with querying the system to obtain a cookie for an already-existing group of objects. Processing begins at a first step 322 where the query is formed. Forming the query at the step 322 is implementation dependent, but may include providing information such as one or more identifiers for the group of objects. Following the step 322 is a step 324 where the query is transmitted to the system (i.e., one or more of the routers 212-214 or one or more routing modules 212'-214', 212"-214"). Processing performed by the routers 212-214 in connection with the query is discussed in more detail elsewhere herein.

Following the step 324 is a test step 326 where it is determined if the result of the query transmitted at the step 324 indicates that the query was successful (i.e., the group of objects were found on one of the CAS systems 206-208). Note that it is possible for the group of objects not to be found on the CAS systems 206-208 for any number of reasons, such as unavailability of one or more of the CAS systems 206-208, a failed connection between components, the objects were never written to the CAS systems 206-208, etc. If it is determined at the test step 326 that the objects were not found, then control transfers from the test step 326 to a step 328 where error processing is performed. The error processing performed at the step 328 may include providing an error message to a user, logging an error, etc. Any appropriate error processing may be performed at the step 328. Following the step 328, processing is complete.

If it is determined at the test step 326 that the objects were found, then control transfers from the test step 326 to a step 332 where a cookie that identifies the location of the group of objects is stored. As discussed in more detail elsewhere herein, the cookie is used in connection with subsequent writes for objects that are grouped together for which it is desirable to have the data stored on a single one of the CAS systems 206-208. Following the step 332, processing is complete.

Figure 9:
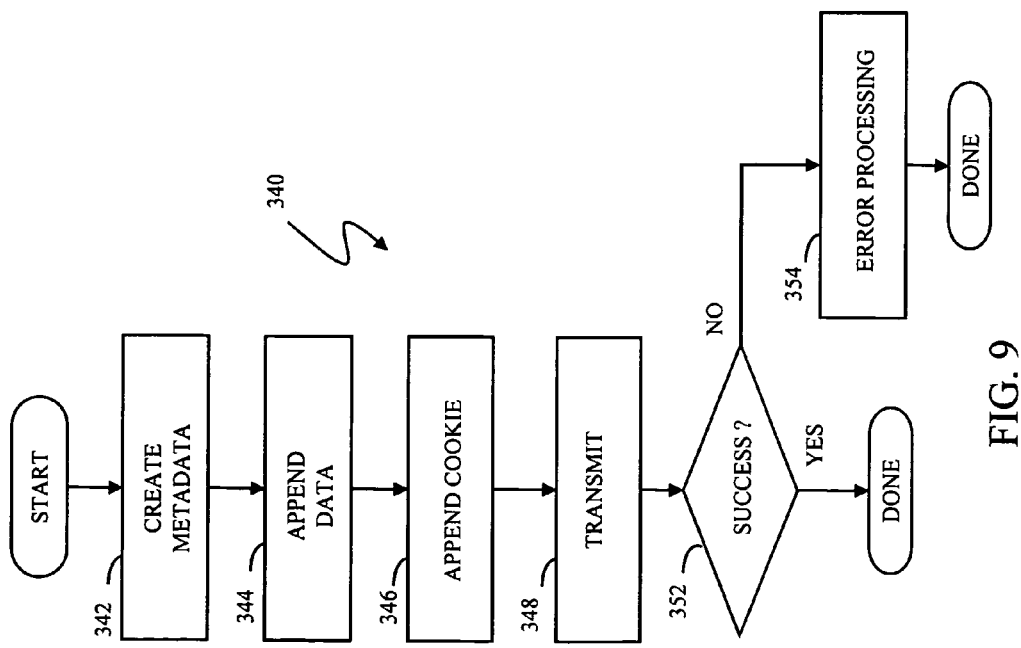
FIG. 9 is a flow chart illustrating steps performed in connection with accessing the system using a cookie according to an embodiment of the system described herein.

Referring to FIG. 9, a flow chart 340 illustrates steps performed in connection with a read or write operation by one of the processing devices 202-204 using the cookie obtained at the step 314 and/or the step 332, discussed above. Processing begins at a first step 342 where the metadata used for the read/write request is created. The specific metadata used at the step 342 is implementation dependent, but may include a time stamp, an identifier for the requester, etc. Following the step 342 is a step 344 where data used for the read/write request is appended. In the case of a write request, the data appended at the step 344 may be the data being written. In the case of a read request, the data provided at the step 344 may include a pointer to where the received data is to be stored.

Following the step 344 is a step 346 where the cookie, indicating the particular one of the CAS systems 206-208 that contains the data, is appended to the read/write request. Following the step 346 is a step 348 where the read/write request is transmitted (e.g., to one of the routers 212-214). Following the step 348 is a test step 352 where it is determined if the result of the request at the step 348 (returned by one of the routers 212-214, for example) indicates that the transfer was successful. There are many reasons why a transfer may have been unsuccessful, such as unavailability of one or more of the CAS systems 206-208, a failed connection between components, etc. If it is determined at the test step 352 that the request was successful, then processing is complete. Otherwise, control transfers from the test step 352 to a step 354 where error processing is performed. The error processing performed at the step 354 may include providing an error message to a user, logging an error, etc. Any appropriate error processing may be performed at the step 354. Following the step 354, processing is complete.

Figure 10:
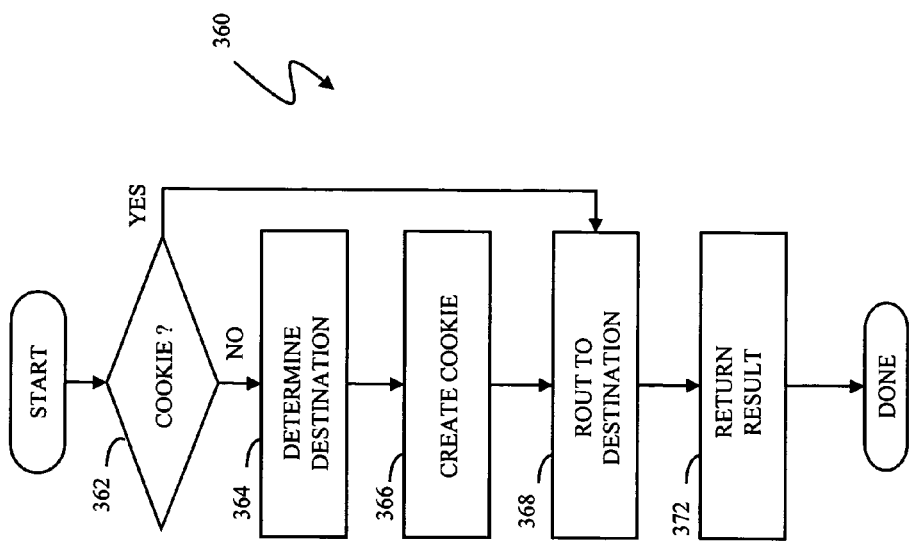
FIG. 10 is a flow chart illustrating steps performed in connection with handling a request according to an embodiment of the system described herein.

Referring to FIG. 10, a flow chart 360 illustrates steps performed in connection with handling a request from one of the processing devices 202-204. The processing illustrated by the flow chart 360 may be performed by one of the routers 212-214 (and/or one of the routing modules 212'214', 212"-214"). Processing begins at a first test step 362 where it is determined if the request includes a cookie. In instances where the request includes a cookie, the request is routed to the particular one of the CAS systems 206-208 indicated by the cookie. In instances where the request does not include a cookie, a particular one of the CAS systems 206-208 is first selected (using any appropriate metric) and then a cookie is created to identify the particular one of the CAS systems 206-208.

If it is determined at the test step 362 that the request does not include a cookie, then control transfers from the test step 362 to a step 364 where a particular one of the CAS systems 206-208 is selected using any appropriate metric or criteria (e.g., load balancing, least recently used, etc.). Following the step 364 is a step 366 where a cookie corresponding to the selected one of the CAS systems 206-208 is created. Any appropriate format may be used for the cookie, so long as it is capable of identifying one of the CAS systems 206-208 in the federated CAS system.

Following the step 366 is a step 368 where the request is routed to the particular one of CAS systems 206-208 identified by the cookie. Note that the step 368 is also reached if it is determined at the test step 362 that the request passed to the routine already included a cookie. Thus, at the step 368, the request may be routed to the particular one of the CAS systems 206-208 identified by a cookie that is either included with the request or created at the step 366. Following the step 368 is a step 372 where the result (passed back from the particular one of the CAS systems 206-208) of servicing the request is returned to the entity that made the request (i.e., one of the processing devices 202-204). Following the step 372, processing is complete.

Figure 11:
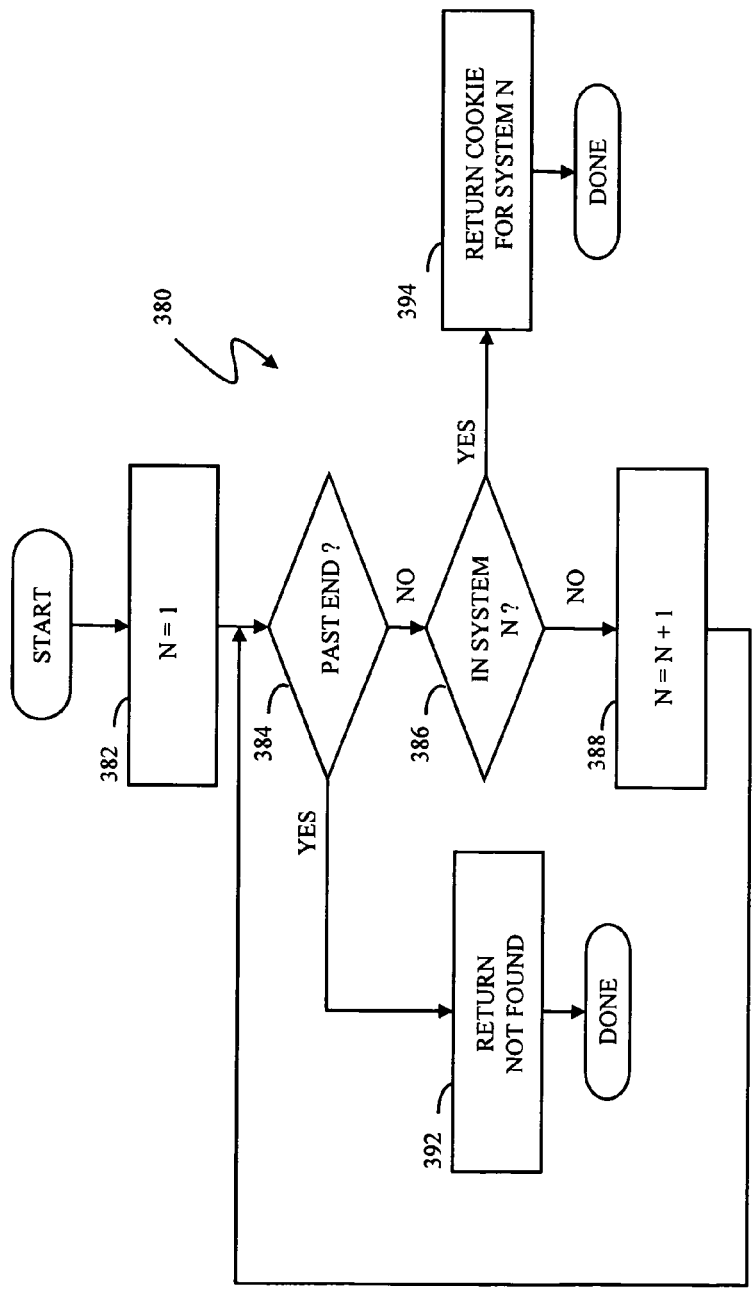
FIG. 11 is a flow chart illustrating steps performed in connection with searching CAS systems to obtain a cookie according to an embodiment of the system described herein.

Referring to FIG. 11, a flow chart 380 illustrates steps performed in connection with receiving a query to obtain a cookie for an existing object or group of objects. The processing illustrated by the flow chart 380 may be performed by one of the routers 212-214 (and/or one of the routing modules 212'-214', 212"-214") and may be executed in response to call provided in the processing illustrated by the flow chart 320 of FIG. 8. The processing illustrated by the flow chart 380 receives one or more objects and, if the objects are found on a particular one of the CAS systems 206-208, returns a cookie indicating the particular one of the CAS systems 206-208.

Processing begins at a first step where an index variable, N, is set to one. The index variable N is used to iterate through the CAS systems 206-208. Following the step 382 is a test step 384 where it is determined if the index variable, N, has exceeded the total number of CAS systems (i.e., if all of the CAS systems 206-208 have been tested). If not, then control transfers from the test step 384 to a test step 386 where it is determined if the object or objects in question are found in the particular one of the CAS systems 206-208 indicated by the value of N. If not, then control transfers from the test step 386 to a step 388 where the index variable, N, is incremented. Following the step 388, control transfers back to the step 384 for another iteration.

If it is determined at the test step 384 that value of N exceeds the number of CAS systems 206-208 (i.e., all of the CAS systems 206-208 have been examined for the object or objects in question), then control transfers from the test step 384 to a step 392 where a not found indicator is returned to the calling entity (e.g., one of the processing devices 202-204). Following the step 392, processing is complete. If it is determined at the test step 386 that the object or objects in question are found in the particular one of the CAS systems 206-208 indicated by the value of N, then control transfers from the test step 386 to a step 394 where a cookie is returned indicating the particular one of the CAS systems 206-208. Following the step 394, processing is complete. Note that it is possible to perform the processing illustrated by the flow chart 380 in parallel to search for the cookie in multiple CAS systems simultaneously.

Note that the system described herein reduces or eliminates the need to separately maintain state information for data grouped together. Thus, for example, the routers 212-214 do not need to maintain information indicating where to store each of a number of multiple blobs associated with a single CDF since a cookie may be provided with each access operation. This facilitates scalability. In addition, it is possible to provide state information with each cookie (e.g., number of access retries) which reduces or eliminates the need to maintain that information separately. Note that, for writes, the federation setup can change in the middle of the write (e.g. system gets added, leading to a different choice of target location should one ask the same question again), but because the choice is recorded in the cookie and its outcome reused, the risk of confusing misplacement is reduced.

The above-described embodiments of the present invention may be implemented in any of numerous ways. For example, the embodiments may be implemented using hardware, software or a combination thereof. When implemented in software, the software code can be executed on any suitable processor or collection of processors, whether provided in a single computer or distributed among multiple computers. The software may be provided in a computer-readable storage medium.

It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions described above.

It should be appreciated that one implementation of the embodiments of the system described herein include at least one computer-readable medium (e.g., a computer memory, a floppy disk, a compact disk, a tape, etc.) encoded with a computer program (i.e., a plurality of instructions), which, when executed on a processor, performs the above-discussed functions. The computer-readable medium can be transportable such that the program stored thereon can be loaded onto any computer environment resource to implement the aspects of the system described herein. In addition, it should be appreciated that the reference to a computer program which, when executed, performs the above-discussed functions, is not limited to an application program running on a host computer. Rather, the term "computer program" is used herein in a generic sense to reference any type of computer code (e.g., software or microcode) that may be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

In some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of managing data on a federated content addressable storage (CAS) system, comprising:
    determining a group of objects to be stored on a single CAS system of the federated CAS system;
    obtaining a cookie corresponding a particular one of the CAS systems of the federated CAS system in response to initially writing at least one object of the group of objects, wherein the cookie identifies the particular one of the CAS systems to which the at least one object of the group of objects is written, and wherein the group of objects is associated and determined for storing on the single CAS system prior to the initial writing of the at least one object of the group of objects to the particular one of the CAS systems; and
    providing the cookie in connection with writing remaining objects of the group of objects following the initial writing of the at least one object of the group of objects to the particular one of the CAS systems, wherein the cookie causes the remaining objects of the group of objects to be written subsequently to the particular one of the CAS systems.

2. A method, according to claim 1, wherein the particular one of the CAS systems is chosen based on a metric.

3. A method, according to claim 2, wherein the metric includes load balancing.

4. A method, according to claim 1, wherein the cookie is provided by at least one router that maintains the federated CAS system.

5. A method, according to claim 4, wherein the at least one router is separate from both a processing device and the particular one of the CAS systems.

6. A method, according to claim 4, wherein the at least one router is integrated with one of: a processing device and the particular one of the CAS systems.

7. A method, according to claim 1, wherein a processing device communicates with the federated CAS system.

8. A method, according to claim 7, wherein applications on the processing device communicate with the federated CAS system through a CAS layer that interprets and translates commands.

9. The method according to claim 1, wherein the group of objects is associated with a single file or document.

10. A non-transitory computer-readable medium storing software that manages data on a federated content addressable storage (CAS) system, the software comprising:
    executable code that determines a group of objects to be stored on a single CAS system of the federated CAS system;
    executable code that provides a cookie corresponding a particular one of the CAS systems of the federated CAS system in response to receiving an initial write request to store at least one object of the group of objects in the federated CAS system, wherein the cookie identifies the particular one of the CAS systems to which the at least one object of the group of objects is written, and wherein the group of objects is associated and determined for storing on the single CAS system prior to the initial writing of the at least one object of the group of objects; and
    executable code that stores remaining objects of the group of objects in the particular one of the CAS systems in response to receiving a write request that includes the cookie, wherein the remaining objects of the group of objects are stored following the initial writing of the at least one object of the group of objects to the particular one of the CAS systems, and wherein the cookie causes the remaining objects of the group of objects to be written subsequently to the particular one of the CAS systems.

11. The non-transitory computer readable medium according to claim 10, wherein the particular one of the CAS systems is chosen based on a metric.

12. The non-transitory computer readable medium according to claim 11, wherein the metric includes load balancing.

13. The non-transitory computer readable medium according to claim 10, wherein the non-transitory computer readable medium is accessed by at least one router that maintains the federated CAS system.

14. The non-transitory computer readable medium according to claim 13, wherein the at least one router is separate from both a processing device and the particular one of the CAS systems.

15. The non-transitory computer readable medium according to claim 13, wherein the at least one router is integrated with one of: a processing device and the particular one of the CAS systems.

16. The non-transitory computer readable medium according to claim 10, wherein the group of objects is associated with a single file or document.

17. A federated content addressable storage (CAS) system, comprising:
- a plurality of CAS systems; and
- a plurality of routers, coupled to the CAS systems, wherein, in response to receiving an initial write request to store at least one object of a group of objects in the federated CAS system, at least one of the routers provides a cookie corresponding to a particular one of the CAS systems of the federated CAS system, wherein the cookie identifies the particular one of the CAS systems to which the at least one object of the group of objects is written, wherein the group of objects is associated and determined for storing on a single CAS system of the federated CAS system prior to the initial writing of the at least one object of the group of objects and, wherein, in response to receiving a write request that includes the cookie, remaining objects of the group of objects are stored in the particular one of the CAS systems, wherein the remaining objects of the group of objects are stored following the initial writing of the at least one object of the group of objects to the particular one of the CAS systems, and wherein the cookie causes the remaining objects of the group of objects to be written subsequently to the particular one of the CAS systems.

18. A federated CAS system, according to claim 17, wherein the particular one of the CAS systems is chosen based on a metric.

19. A federated CAS system, according to claim 18, wherein the metric includes load balancing.

20. A federated CAS system, according to claim 17, wherein the at least one router is separate from the particular one of the CAS systems.

21. A federated CAS system, according to claim 17, wherein the at least one router is integrated with the particular one of the CAS systems.

22. The federated CAS system according to claim 17, wherein the group of objects is associated with a single file or document.

* * * * *